Jan. 12, 1965     L. H. SCHMOHL     3,164,890
METHOD OF AND TOOLS FOR ASSEMBLY OF A PACKING
RETAINER ON A THREADED COUPLING MEMBER
Original Filed May 31, 1956

INVENTOR.
LELAND H. SCHMOHL
BY
Oberlin & Limbach
ATTORNEYS.

United States Patent Office 3,164,890
Patented Jan. 12, 1965

3,164,890
METHOD OF AND TOOLS FOR ASSEMBLY OF A PACKING RETAINER ON A THREADED COUPLING MEMBER
Leland H. Schmohl, Chagrin Falls, Ohio, assignor to Parker-Hannifin Corporation, Cleveland, Ohio, a corporation of Ohio
Original application May 31, 1956, Ser. No. 588,440. Divided and this application Feb. 4, 1960, Ser. No. 7,057
3 Claims. (Cl. 29—157)

The present invention relates as indicated to the novel method of and tools for assembly of a packing retainer on a threaded coupling member. This application is a division of my copending application Serial No. 588,440, filed May 31, 1956, now abandoned.

It is one object of this invention to provide a novel method of assembling a rigid packing retainer ring in snug embracing relation around the smooth uniform diameter peripheral groove between uniform pitch diameter threads of a coupling member.

Another object of this invention is to provide a novel set of tools or dies to so assemble the packing retainer ring onto the coupling member.

Other objects of the invention will appear as the description proceeds.

To the accomplishment of the foregoing and related ends, said invention then comprises the features hereinafter fully described and particularly pointed out in the claims, the following description and the annexed drawing setting forth in detail an illustrative embodiment of the invention, this being indicative, however, of but one of the various ways in which the principle of the invention may be employed.

Figure 4:
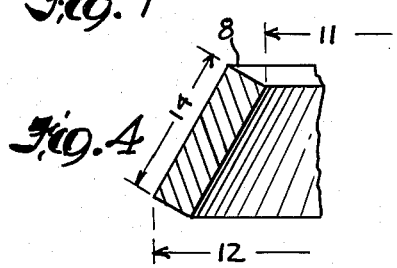
Figures 5, 6, 7:
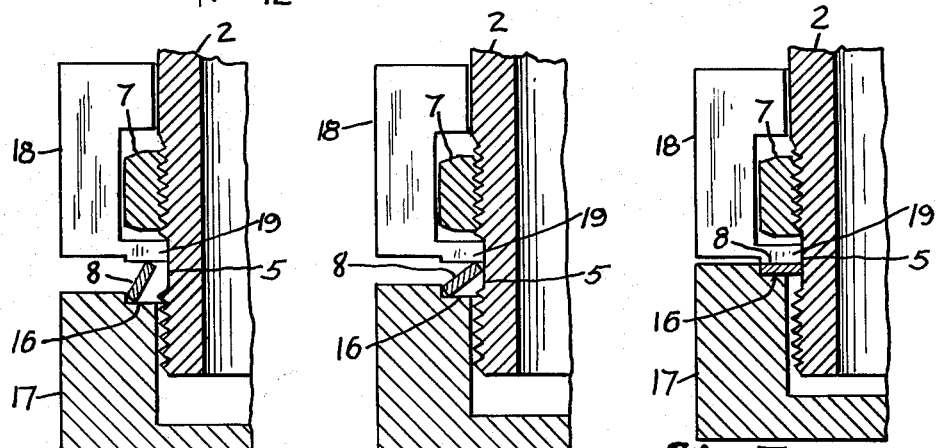

FIG. 4 is an enlarged fragmentary cross-section view of the intermediate frusto-conical shape of the packing retainer having an inside diameter to slip over the threads of the externally threaded coupling member; and FIGS. 5, 6 and 7 show the set of tools and successive method steps for assembling the packing retainer of FIG. 4 in snug embracing relation around the peripheral groove of the externally threaded coupling member.

Figure 1:
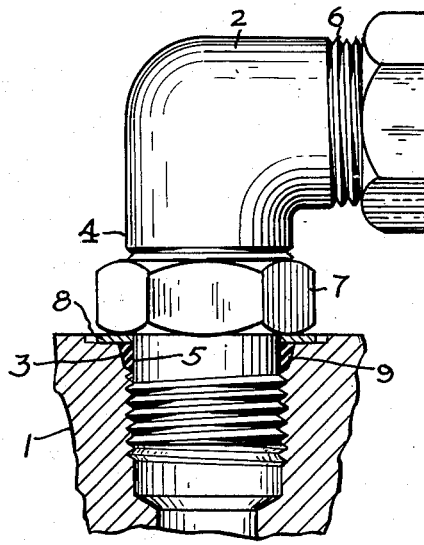
FIG. 1 is a side elevation view partly in cross-section showing the present packed joint.
Figure 2:
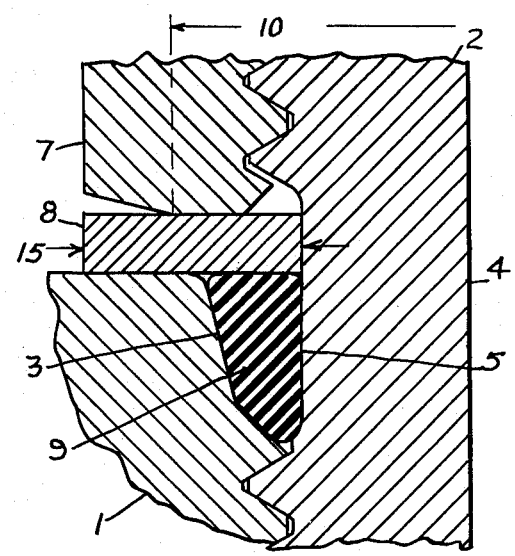
FIG. 2 is an enlarged fragmentary cross-section view of the packing chamber and packing retainer.

As shown in FIGS. 1 and 2, the packed joint herein comprises coupling members 1 and 2 which are screwed together, the internally threaded coupling member 1 being shown as a boss having a tapered or frusto-conical counterbore 3 which constitutes the outer wall of an annular packing chamber, and the externally threaded coupling member 2 being shown as an elbow whose one threaded leg 4 is formed with a peripheral groove 5 which constitutes the inner wall of said packing chamber. The axial dimension of the groove 5, as well known in the art, is preferably such that when the coupling member 2 is screwed into the boss 1 to approximately the desired extent with groove 5 opposite the counterbore 3, said coupling member 2 may be turned in or backed off so that the other leg 6 points in the desired direction.

A lock nut 7 is threaded onto the series of threads which are axially beyond the end of the boss 1 and in the conventional boss joint the lock nut 7 would be turned down to firmly abut the end of said boss 1, thereby leaving a helical gap between the lock nut and coupling member threads or between the lock nut threads and the peripheral groove 5.

However, in the present case there is interposed between the lock nut 7 and the end of boss 1 a rigid packing retainer 8 which is clamped between said boss and said lock nut and which snugly embraces the peripheral groove 5 of coupling member 2. Said retainer 8 thus serves to completely close the annular packing chamber so that there are no gaps or clearances into which the deformable packing ring 9 in said chamber may be extruded under the influence of high fluid pressure. Moreover, said retainer 8 engages the end of the boss 1 around the counterbore 3 so as to enable the use of a lock nut 7 which is of minimum size commensurate with the thread size and the number of threads which have to be engaged. In the present case, a hex lock nut 7 is used and the distance 10 across the flats thereof is substantially less than would otherwise be required to properly overlap around the end of the boss 1.

As aforesaid, the retainer 8 has a snug fit on the groove 5 but said retainer is axially movable with respect to the coupling member 2 when the latter is assembled with the boss 1. Thus, when initially screwing in the coupling member 2 into the boss 1, the retainer 8 may be urged upwardly with respect to the coupling member 2, or vice versa said retainer 8 may be forced downwardly by the lock nut 7 while the coupling member 2 is held against rotation.

The retainer 8 is preferably a continuous ring or washer made of relatively rigid, strong and heavy guage metal such as cold rolled steel of 16 gauge and is assembled on the coupling member 2 in a manner now to be described in detail.

Figure 3:
FIG. 3 is an enlarged fragmentary cross-section view showing the initial flat shape of the packing retainer as cut or punched from sheet metal.

First, the retainer 8 is cut from flat sheet metal stock with an inside and an outside diameter such that when said ring is deformed from the flat shape of FIG. 3 to the frusto-conical shape of FIG. 4, the inside diameter 11 is sufficiently large to slip over the external threads of the coupling member 2 and the outside diameter 12 is approximately the same as the desired outside diameter of the ring as reflattened in FIGS. 1 and 2. The slant height 14 of said frusto-conical ring is approximately equal to the radial distance 15 (see FIG. 2) from the outside diameter of the reflattened ring to the diameter of the groove 5.

The ring 8 in frusto-conical form is then positioned around the groove 5 of the coupling member 2 as shown in FIG. 5 with its large end fitting into the flat bottom recess 16 of the one-piece tool 17 to engage the bottom wall of the recess and to be embraced by the outer wall of the recess.

Another tool 18 comprising separable mating parts is so designed that when the parts thereof are brought together they define an inturned cylindrical rib 19 which has a flat bottom face parallel to the bottom of the recess 16, said rib 19 having an inside diameter which is approximately equal to the diameter of groove 5.

Accordingly, when the tools 17 and 18 are moved axially toward each other, the frusto-conical ring 8 is progressively flattened as in FIGS. 5, 6 and 7 by application of axial forces uniformly around the inside and outside diameters of the ring 8 while the outside diameter is restrained from expansion by the wall of recess 16. In the finally flattened condition of the retainer 8, as in FIG. 7, the same snugly embraces the groove 5 so that there is no gap into which the packing ring 9 may be extruded under the influence of high fluid pressure. In performing the foregoing assembly operations, the lock nut 7 will, of course, first have been threaded onto the coupling member 2 and therefore the retainer 8 functions not only as a retainer for the packing ring 9 when the coupling member 2 is installed in a boss but additionally serves as a retainer to prevent loss of the lock nut 7.

It is to be understood that during use the mating parts of the tool 18 will be held together, one part for example being mounted on the fixed jaw of a machine or press and another part thereof secured to the movable jaw of said machine or press. If desired, the mating parts of said tool 18 may be hingedly connected to each other for opening and closing movement, or said mating parts may otherwise be separably secured together for flattening the retainer 8 from its frusto-conical form to reflattened final form.

Other modes of applying the principle of the invention may be employed, change being made as regards the details described, provided the features stated in any of the following claims, or the equivalent of such, be employed.

I therefore particularly point out and distinctly claim as my invention:

1. The method of assembling a circumferentially continuous metal ring to snugly embrace a smooth peripheral groove of uniform diameter formed between the uniform pitch diameter threads of an externally threaded coupling member and to retain a nut on said member which comprises screwing a nut on said member to a zone axially beyond such groove; providing a generally frusto-conical ring which has the desired outside diameter, an inside diameter to slip over the external threads, a thickness less than the axial width of such groove, and an slant height which corresponds to the radial distance from said outside diameter to said groove; coaxially positioning said ring around said groove; and flattening said ring while retaining the outside diameter thereof from radial expansion, whereby said ring is locked on said coupling member in snug embracing relation around said groove for axial actuation along such groove by turning of said nut in a direction tending to unscrew it from said member.

2. The method of assembling a circumferentially continuous metal ring to snugly embrace a smooth peripheral groove of uniform diameter formed between the uniform pitch diameter threads of an externally threaded coupling member and to retain a nut on said member which comprises screwing a nut on said member to a zone axially beyond such groove; providing a generally frusto-conical ring which has the desired outside diameter, an inside diameter to slip over the external threads, a thickness less than the axial width of such groove, and a slant height which corresponds to the radial distance from said outside diameter to said groove; coaxially positioning said ring around said groove; and flattening said ring by application of axial force uniformly around said ring adjacent the outside and inside diameters thereof while retaining the outside diameter thereof from radial expansion, whereby said ring is locked on said coupling member in snug embracing relation around said groove for axial actuation along such groove by turning of said nut in a direction tending to unscrew it from said member.

3. A set of tools for assembling a circumferentially continuous, frusto-conical ring in snug embracing relation around the smooth uniform diameter peripheral groove of an externally threaded coupling member which groove is of axial width greater than the thickness of said ring, said set of tools comprising a first tool which is recessed to embrace the outside diameter of said ring and to engage said ring adjacent the outside diameter thereof, and a second tool comprising mating parts which form an inturned circular rib, said rib being of inside diameter approximately the same as the diameter of such groove whereby, when said tools are moved axially toward each other, the frusto-conical ring is flattened by application of axial force adjacent the inside and outside diameters thereof while the outside diameter thereof remains substantially unchanged by reason of the embracing recess of said first tool; and means for so moving said tools coaxially toward each other; the bottom of the recess in said first tool and the opposed face of said rib being parallel to engage the opposite sides of the ring when flattened therebetween.

References Cited in the file of this patent

UNITED STATES PATENTS

| | | |
|---|---|---|
| 859,733 | Bot | July 9, 1907 |
| 1,058,210 | Welch | Apr. 8, 1913 |
| 1,463,144 | Carter | July 24, 1923 |
| 1,561,872 | Lovejoy | Nov. 17, 1925 |
| 1,748,452 | Martins | Feb. 25, 1930 |
| 1,826,404 | Rabezzana | Oct. 6, 1931 |
| 1,911,406 | Tevander | May 30, 1933 |
| 1,917,743 | Walker | July 11, 1933 |
| 2,333,120 | Parker | Nov. 2, 1943 |
| 2,459,608 | Wolfrom | Jan. 18, 1949 |
| 2,492,041 | Heise | Dec. 20, 1949 |
| 2,564,372 | Phelps | Aug. 14, 1951 |
| 2,757,945 | Bingham | Aug. 7, 1956 |
| 2,904,876 | Edelen | Sept. 22, 1959 |
| 2,919,147 | Nenzell | Dec. 29, 1959 |